US011394317B2

(12) United States Patent
Brogan et al.

(10) Patent No.: US 11,394,317 B2
(45) Date of Patent: Jul. 19, 2022

(54) CONVERTER NETWORK BRIDGE CONTROLLER

(71) Applicant: Siemens Gamesa Renewable Energy A/S, Brande (DK)

(72) Inventors: Paul Brian Brogan, Glasgow (GB); Thyge Knueppel, Værløse (DK); Andrew Roscoe, Glasgow (GB); Douglas Elliott, Glasgow (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 121 days.

(21) Appl. No.: 16/980,112

(22) PCT Filed: Feb. 14, 2019

(86) PCT No.: PCT/EP2019/053727
§ 371 (c)(1),
(2) Date: Sep. 11, 2020

(87) PCT Pub. No.: WO2019/174849
PCT Pub. Date: Sep. 19, 2019

(65) Prior Publication Data
US 2021/0021209 A1 Jan. 21, 2021

(30) Foreign Application Priority Data
Mar. 16, 2018 (EP) .................................... 18162326

(51) Int. Cl.
*H02M 7/5395* (2006.01)
*H02J 3/38* (2006.01)
(Continued)

(52) U.S. Cl.
CPC .......... *H02M 7/5395* (2013.01); *H02J 3/381* (2013.01); *H02J 3/40* (2013.01); *H02M 7/00* (2013.01);
(Continued)

(58) Field of Classification Search
CPC .......... H02J 3/381; H02J 3/40; H02J 2300/28; H02M 7/00; H02M 7/53871
See application file for complete search history.

(56) References Cited

U.S. PATENT DOCUMENTS 6,366,483 B1 * 4/2002 Ma ...................... H02M 1/4216
363/41
7,804,184 B2 9/2010 Yuan et al.
(Continued)

FOREIGN PATENT DOCUMENTS

EP 2221936 A2 8/2010
EP 2320549 A1 5/2011
(Continued)

OTHER PUBLICATIONS

Lerna, R.; Zhu, J. Roscoe, A. J.; Yu, M.; Dysko, A.; Booth, C. D. & Urdal, H. "Effects of VSM convertor control on penetration limits of non-synchronous generation in the GB power system" 15th Wind Integration Workshop, 2016.
(Continued)

*Primary Examiner* — Yusef A Ahmed
(74) *Attorney, Agent, or Firm* — Schmeiser, Olsen & Watts LLP

(57) ABSTRACT

A converter network bridge controller for a power converter hardware being connectable to an alternating current electricity network is provided. The controller includes an output unit configured for generating a quadrature voltage component reference to a PWM modulator which determines the switching of the power converter hardware, wherein the quadrature voltage component reference includes a first signal and a second signal. The output unit includes a first part and a second part. The first part is configured for generating the first signal based on a current reference for an active current to be generated by the power converter hardware. The second part is configured for providing the
(Continued)

second signal to reduce a difference between a converter active current component of measured feedback current and the current reference for active current.

13 Claims, 5 Drawing Sheets

(51) Int. Cl.
*H02M 7/5387* (2007.01)
*H02J 3/40* (2006.01)
*H02M 7/00* (2006.01)

(52) U.S. Cl.
CPC ..... *H02M 7/53871* (2013.01); *H02J 2300/28* (2020.01)

(56) References Cited

U.S. PATENT DOCUMENTS

| | | | |
|---|---|---|---|
| 9,270,200 B2 | 2/2016 | Roscoe et al. | |
| 10,594,227 B1* | 3/2020 | Blasko | H02P 27/16 |
| 2007/0108771 A1* | 5/2007 | Jones | H02P 9/102 |
| | | | 290/44 |
| 2007/0121354 A1 | 5/2007 | Jones et al. | |
| 2010/0109328 A1* | 5/2010 | Li | H02M 7/53875 |
| | | | 290/44 |
| 2011/0103110 A1* | 5/2011 | Godridge | H02J 3/386 |
| | | | 363/74 |
| 2012/0032617 A1* | 2/2012 | Jones | H02P 23/06 |
| | | | 318/503 |
| 2012/0280569 A1* | 11/2012 | Alam | H02J 3/386 |
| | | | 307/60 |
| 2014/0197774 A1* | 7/2014 | Liu | H02M 1/126 |
| | | | 363/40 |
| 2014/0225548 A1* | 8/2014 | Xu | H02P 21/13 |
| | | | 318/400.33 |
| 2014/0307488 A1* | 10/2014 | Brogan | H02J 3/50 |
| | | | 363/35 |
| 2014/0362617 A1* | 12/2014 | Li | H02M 7/53875 |
| | | | 363/79 |
| 2015/0123579 A1* | 5/2015 | Liu | H02M 7/53873 |
| | | | 318/400.05 |
| 2016/0204612 A1* | 7/2016 | Brogan | H02M 5/4585 |
| | | | 307/82 |
| 2016/0218657 A1* | 7/2016 | Nondahl | H02P 27/08 |
| 2017/0009743 A1* | 1/2017 | Brogan | F03D 7/042 |
| 2018/0026449 A1* | 1/2018 | Benosman | H02J 3/385 |
| | | | 307/84 |
| 2019/0140571 A1* | 5/2019 | Freire | H02J 3/386 |
| 2019/0237972 A1* | 8/2019 | Wang | H02M 1/34 |
| 2019/0348840 A1* | 11/2019 | Riaz | H02M 7/53871 |
| 2019/0356248 A1* | 11/2019 | Watanabe | H02P 6/16 |
| 2020/0303943 A1* | 9/2020 | Jin | H02J 3/381 |
| 2021/0075311 A1* | 3/2021 | Jin | H02M 7/53875 |
| 2021/0135563 A1* | 5/2021 | Wei | H02M 1/08 |

FOREIGN PATENT DOCUMENTS

| | | |
|---|---|---|
| EP | 2566035 A2 | 3/2013 |
| EP | 3116086 A1 | 1/2017 |
| WO | 2013/026583 A1 | 2/2013 |
| WO | 2015/024583 A1 | 2/2015 |

OTHER PUBLICATIONS

Hong-seok Song, Kwanghee Nam: "Dual Current Control Scheme for PWM Converter Under Unbalanced Input Voltage Conditions"; IEEE Transactions on Industrial Electronics, vol. 46, No. 5, Oct. 1999, pp. 953-959.

I. Erlich, B. Paz, M. Koochack Zadeh, S. Vogt, C. Buchhagen, C. Rauscher, A. Menze, J. Jung: "Overvoltage Phenomena in Offshore Wind Farms Following Blocking of the HVDC Converter" IEEE 2016; 978-1-5090-4168-8/16/$31.00 © 2016 IEEE.

International Search Report and Written Opinion dated Apr. 15, 2019 for PCT/EP2019/053727.

* cited by examiner

CONVERTER NETWORK BRIDGE CONTROLLER

CROSS-REFERENCE TO RELATED APPLICATIONS

This application claims priority to PCT Application No. PCT/EP2019/053727, having a filing date of Feb. 14, 2019, which is based on EP Application No. 18162326.5, having a filing date of Mar. 16, 2018, the entire contents both of which are hereby incorporated by reference.

FIELD OF TECHNOLOGY

The following relates to the field of controller devices for controlling a power converter hardware and methods of operating such a controller device.

BACKGROUND

Many current power converters of wind turbines or photovoltaic systems use closed-loop current control, closed-loop vector current control or variation dual vector current control. These control systems do not inherently provide characteristics which act to support the AC system in the similar way as a synchronous machine does.

For example, if the AC system frequency of the AC system (i.e. an AC electricity network such as a grid or an islanded electricity network) drops, e.g. due to a loss of a large power station, transiently the AC system frequency provided by a conventional current control power converter reduces, and thus maintains a constant power transfer. In contrast, a synchronous generator with a large rotating mass cannot change its rotational speed instantaneously and thus an angle error develops between the back electromagnetic force (EMF) of the generator and the AC system. Hence, an increased power flow results from the synchronous generator to the electrical system. This transient power flow extracts energy from the rotating mass of the generator and transfers it into the AC system and thus provides "inertia" to the AC system. The opposite of this is also true, when a large load is removed from a power system the system frequency increases, and again current control does not respond to this (and acts to maintain constant power flow). In contrast, a synchronous generator will act to maintain pre-event rotational speed, and thus transiently import power.

EP 2221936 B2 discloses a system and method for control of a grid connected power generating system including a wind turbine, a converter, a first controller and a second controller. The wind turbine supplies electrical power to a power grid and the converter couples the wind turbine to the power grid. The first controller calculates voltage commands to emulate a phasor back electromotive force behind an inductance. The controller further generates converter switching commands from the voltage commands. The voltage commands include the voltage magnitude reference and an internal frequency reference calculated from a power imbalance between an active power references and the electrical power. The second controller is used to limit a converter current.

SUMMARY

An aspect relates to an improved technique that enables to provide an efficient power converter, while substantially avoiding or at least reducing one or more of the above-identified problems.

According to a first aspect of the herein disclosed subject matter a controller is provided, in particular a converter network bridge controller for a power converter hardware (of a power converter) being connectable to an alternating current electricity network. According to an embodiment of the first aspect, the controller comprises: an output unit (e.g. a current controller) configured for generating a quadrature voltage component reference to a pulse-width modulation (PWM) modulator which determines the switching of the converter, wherein the quadrature voltage component reference comprises a first signal and a second signal; the output unit comprising a first part (e.g. a steady state component) and a second part (e.g. a corrective control unit); the first part being configured for generating the first signal based on a current reference for an active current to be generated by the power converter hardware; and the second part being configured for providing the second signal so as to reduce a difference between (e.g. to match) an converter active current component of measured feedback current and the current reference for active current.

According to a second aspect of the herein disclosed subject matter, a power converter is provided. According to an embodiment of the second aspect, there is provided a power converter comprising: a converter network bridge controller according to the first aspect or an embodiment thereof, and a power converter hardware controlled by an output signal of the converter network bridge controller, wherein the output signal comprises the quadrature voltage component reference. Hence, the output signal of the converter network bridge controller is a control signal for the power converter hardware.

According to a third aspect of the herein disclosed subject matter, a method of generating a control signal for a power converter hardware is provided. According to an embodiment of the third aspect, there is provided a method of generating a control signal for a power converter hardware being connectable to an alternating current electricity network, the method comprising: generating a quadrature component of the control signal depending on a first signal and a second signal; generating the first signal based on a current reference for an active current to be generated by the power converter hardware; and providing the second signal to reduce a difference between (e.g. to match) an converter active current component of measured feedback current and the current reference for active current.

According to a fourth aspect of the herein disclosed subject matter, a computer program product (non-transitory computer readable storage medium having instructions, which when executed by a processor, perform actions) is provided. According to an embodiment of the fourth aspect, there is provided a computer program product comprising a non-transient program element, the non-transient program element being configured for, when executed by a processor device, controlling the method according to the third aspect or an embodiment thereof.

According to an embodiment, the quadrature voltage component reference is a d-axis reference voltage of a d-q axis coordinate system. As usual with field oriented control, the d-q axis coordinate system has the advantage that control is performed via the manipulation of DC quantities instead of a three-phase time varying (AC) quantities. According to a further embodiment, the power converter hardware is operating with a pulse width modulation (PWM) strategy and an output signal of the converter network bridge controller (and in particular the quadrature voltage component reference of the output signal) is a control signal for a PWM modulator of the power converter. In particular, according to an embodiment the output signal is a PWM voltage reference for the PWM modulator which determines the switching of the power converter hardware.

Embodiments of the herein disclosed subject matter are based on the idea that the AC system is stabilized (in particular in the sense that inertia" is added to the AC system) by controlling a quadrature component in response to a current reference for an active current. In particular, embodiments of the herein disclosed subject matter are based on the idea that the AC system is stabilized by changing the coupling of a q-axis controller (e.g. a q-axis proportional-integral (PI) controller) to add voltage to the d-axis rather than the q-axis and, additionally or alternatively, by changing the coupling of a d-axis controller (e.g. a d-axis proportional-integral (PI) controller) to add voltage to the q-axis rather than the d-axis.

Embodiments of the herein disclosed subject matter permit operation on very weak electricity networks (AC systems) with a short circuit ratio (SCR)<<1 and on islanded electricity networks.

According to an embodiment, the output unit is further configured for generating an in-phase, or direct, q-axis, voltage component reference to the PWM modulator. The in-phase voltage component reference may be the main component of the output signal (i.e. it mainly determines the voltage magnitude of the output signal provided to the PWM modulator).

According to an embodiment, the in-phase voltage component reference comprises a third signal and a fourth signal. The output unit may comprise a third part (e.g. a steady state component) and a fourth part (e.g. a corrective control unit). According to an embodiment, the third part is configured for generating the third signal based on a current reference for reactive current (also referred to as Idp*); and the fourth part is configured for providing the fourth signal to reduce a difference between (e.g. to match) an converter reactive current component of measured feedback current and the current reference for reactive current.

According to an embodiment, the current reference for reactive current is provided by a voltage controller (Vac controller), e.g. based on the voltage demand and the measured voltage magnitude.

According to an embodiment, a (further) part of the output unit is configured for generating the in-phase voltage component reference based on a voltage demand and a voltage feedback signal.

According to an embodiment, the in-phase voltage component reference comprises a further (e.g. fifth) signal which is representative of the desired fundamental frequency voltage on the output of the converter. For example, according to an embodiment, the fifth signal is one of an alternating current voltage demand (also referred to as Vac*), a nominal value for the alternating current voltage, and a filtered q-axis voltage feedback. The alternating current voltage demand is the voltage magnitude reference on the grid side of the converter reactor and is the voltage magnitude the converter is trying to achieve by providing the in-phase voltage component reference and the quadrature voltage component reference to the PWM modulator.

According to an embodiment, the in-phase voltage component reference is generated by adding the respective signals, e.g. the third signal, the fourth signal and optionally the fifth signal.

According to an embodiment, the output unit comprises a summing unit for adding the third signal and the fourth signal (and optionally the fifth signal) to thereby generate the in-phase component of the output signal.

According to a further embodiment, instead of the third and the fourth signal described above the in-phase voltage component comprises an alternative forth signal which is based on the alternating current voltage demand and a measured feedback voltage magnitude. According to an embodiment, the alternative fourth signal is provided so as to reduce a difference between the alternating current voltage demand and the measured feedback voltage magnitude. Accordingly, in an embodiment the third part of the output unit is omitted and the fourth part is configured for providing the fourth signal so as to reduce a difference between the alternating current voltage demand and the measured feedback voltage magnitude.

According to an embodiment, the measured feedback voltage magnitude Vmag is the square root of the sum of the square of the q axis feedback voltage magnitude Vdp and the square of the d-axis feedback voltage magnitude Vqp.

$$V\text{mag}=\text{sqrt}(Vdp^\wedge 2+Vqp^\wedge 2)$$

According to an embodiment, the q axis feedback voltage magnitude may be filtered signal (which may then be referred to as Vqpf) and/or the d-axis feedback voltage magnitude may be a filtered signal (which may then be referred to as Vdpf).

According to an embodiment, the quadrature voltage component reference comprises a sixth signal which is representative of the alignment of the d-q axis coordinate system and which is zero if the d-q axis coordinate system is aligned with the measured voltage of the electricity network. However, as the sixth signal is usually zero or close to zero, according to an embodiment the sixth signal is omitted when calculating the quadrature voltage component reference.

According to an embodiment, the quadrature voltage component reference is generated by adding the first signal, the second signal and optionally the sixth signal.

According to an embodiment, the output unit comprises a summing unit for adding the first signal and the second signal (and optionally the sixth signal) to thereby generate the quadrature component of the output signal.

According to an embodiment, the converter network bridge controller further comprises a tracking unit, in particular a phase-locked-loop (PLL) controller; the tracking unit being further configured for aligning the d-q axis coordinate system with an input signal which is based on the measured voltage (Vfb).

A transformation from a three-phase alternating current system into the d-q axis coordinate system may be performed using a grid angle (theta0) calculated by the tracking unit (also referred to herein as the 3/2 conversion). A main objective of the tracking unit is to align, in the steady state, the converter's internal d-q axis coordinate system (also referred to as d-q axis reference frame) with the measured voltage. It does this by nulling (or controlling) the d-axis component of the measured feedback voltage to zero, e.g. via the action of a proportional-integral (PI) controller of the tracking unit, as is known in the art.

According to an embodiment the input signal to the tracking unit is based on a voltage feedback signal indicative of an instantaneous d-axis voltage component of the measured network voltage. According to a further embodiment, the tracking unit is configured to provide a frequency signal indicative of a grid frequency (f0) and an angle signal indicative of a grid angle (theta0), the frequency signal and the angle signal (f0, theta0) being computed based on the input signal to the tracking unit.

According to an embodiment, the second part and/or the fourth part of the output unit comprises at least one of a proportional-integral controller and a proportional-integral-differential controller. However, according to other embodiments, any other suitable controller may be used.

According to an embodiment, the input signal to the tracking unit is further based on the frequency signal of the tracking unit. For example, according to an embodiment the tracking unit comprises a summing unit (also referred to as first summing unit) being configured for summing (i) the voltage feedback signal and (ii) an offset component being based on the frequency signal to thereby provide the input signal. For example, according to an embodiment a gain stage is provided (which may be referred to as VdDroop) which receives the frequency signal and provides in response hereto the offset component. The offset component may assist the tracking unit in finding a stable frequency operating point if the electricity network is an island electricity network and may allow a frequency dependent voltage tracking error.

According to a further embodiment, the current reference for active current (Iqp*) comprises an offset component which is based on the frequency signal of the tracking unit. The offset component of the current reference for active current may assist the active current operating point to balance the active load in an islanded electricity network with the active current controlled by the converter network bridge controller. According to an embodiment, the offset of the current reference for active current is generated by manipulation of a nominal current reference for active current which is based on a power demand and the measured feedback voltage magnitude. According to a further embodiment, the offset component of the current reference for active current is generated by a manipulation of the power demand. In the case of a wind turbine converter, the power demand is usually based on the prevailing wind conditions, just to give an example.

According to an embodiment, the converter network bridge controller comprises a summing unit (also referred to as second summing unit) which is configured for receiving the nominal current reference for active current which is based on a power demand and a measured feedback voltage magnitude; wherein the (second) summing unit is further configured for receiving a current offset signal which is based on the frequency signal of the tracking unit; and wherein the (second) summing unit is configured for providing the current reference for active current (Iqp*) based on the nominal current reference for active current and the current offset signal. In this embodiment, the current offset signal corresponds to the offset component of the current reference for active current.

According to a further embodiment, the converter network bridge controller comprises a summing unit (also referred to as second or third summing unit) which is configured for receiving a power demand; wherein the (second/third) summing unit is further configured for receiving a power offset signal which is based on the frequency signal of the tracking unit; and wherein the (second/third) summing unit is configured for providing a modified power demand, which is based on the power demand for active current and the power offset signal, to a current reference calculation unit for calculating the current reference for active current (Iqp*) based on the modified power demand and a measured feedback voltage magnitude.

The current offset signal and the current reference for active current which is based on the modified power demand may provide for a steady state active current (power) dependency on the frequency; such relationship is often referred to as a governor control in power engineering. Those elements combined allow the converter to have a frequency to power relationship that enables a group of converters with the described control or other generators to share the balancing of active power demand in an isolated (islanded) network. In such a network it may be necessary for the generators to be able satisfy the fluctuating active power demand in a way where a given number of participating generators share the difference between scheduled power (the sum of the active power references) and the actual demand.

The participating network bridge controllers "see" the same frequency that allows them to equally change their power output for a change in frequency.

According to an embodiment, the first part of the output unit is configured for providing the first signal (Vqxc) further depending on the frequency signal (e.g. $2*\pi*f0$ or $\omega$) or the angle signal (theta0) of the tracking unit. For example, according to an embodiment the first signal is calculated based on the current reference for active current, the frequency signal for the angle signal of the tracking unit, and an inductance of a line reactor plus turbine transformer. According to an embodiment, the first signal is calculated as the product of these quantities.

According to a further embodiment, the third part of the output unit is configured for providing the third signal (Vdxc) further depending on the frequency signal (e.g. $2*\pi*f0$ or $\omega$) or the angle signal (theta0) of the tracking unit. For example, according to an embodiment the third signal is calculated based on the current reference for reactive current, the frequency signal or the angle signal of the tracking unit, and an inductance of a line reactor plus turbine transformer. According to an embodiment, the third signal is calculated as the product of these quantities.

According to an embodiment, any of the signals described herein may be subjected to a suitable filter which in an embodiment may contain at least one of an adaptive (i.e. frequency dependent) filter and a non-adaptive filter. Providing suitable filters is a common measure known by those skilled in the art.

According to a further embodiment, the voltage feedback signal (Vdpf) is a filtered d-axis component calculated from the measured 3-phase network voltages (of the electricity network) and thetha0.

As used herein, reference to a computer program product is intended to be equivalent to a reference to a non-transient program element and/or a computer readable medium containing a non-transient program element for controlling a processor device (e.g. a computer system) to effect and/or coordinate the performance of the herein described method and its embodiments.

The non-transient program element may be implemented as computer readable instruction code by use of any suitable programming language, such as, for example, JAVA, C++, and may be stored on a computer-readable medium (removable disk, volatile or non-volatile memory, embedded memory/processor, etc.). The non-transient program element is operable to program a computer or any other programmable device to carry out the intended functions. The computer program product may be available from a network, such as the World Wide Web, from which it may be downloaded.

The herein disclosed subject matter may be realized by a computer program respectively software. However, the herein disclosed subject matter may also be realized by one or more specific electronic circuits respectively hardware. Furthermore, the herein disclosed subject matter may also be realized in a hybrid form, i.e. in a combination of software modules and hardware modules.

According to embodiments of the first aspect, the converter network bridge controller is adapted for providing the functionality and/or features of one or more of the herein disclosed embodiments and/or for providing the functionality and/or features as required by one or more of the herein disclosed embodiments, in particular of embodiments of any one of the aspects disclosed herein.

According to embodiments of the second aspect, the power converter is adapted for providing the functionality and/or features of one or more of the herein disclosed embodiments and/or for providing the functionality and/or features as required by one or more of the herein disclosed embodiments, in particular embodiments of any one of the aspects disclosed herein.

According to embodiments of the third aspect, the method is adapted for providing the functionality and/or features of one or more of the herein disclosed embodiments and/or for providing the functionality and/or features as required by one or more of the herein disclosed embodiments, in particular embodiments of any one of the aspects disclosed herein.

According to embodiments of the fourth aspect, the computer program product is adapted for providing the functionality and/or features of one or more of the herein disclosed embodiments and/or for providing the functionality and/or features as required by one or more of the herein disclosed embodiments, in particular embodiments of any one of the aspects disclosed herein.

In the above there have been described and in the following there will be described exemplary embodiments of the subject matter disclosed herein with reference to a converter network bridge controller, a power converter and respective methods and computer program products. It has to be pointed out that of course any combination of features relating to different aspects of the herein disclosed subject matter is also possible. In particular, some features have been or will be described with reference to apparatus type embodiments whereas other features have been or will be described with reference to method type embodiments. However, a person skilled in the art will gather from the above and the following description that, unless other notified, in addition to any combination of features belonging to one aspect also any combination of features relating to different aspects or embodiments, for example even a combinations of features of apparatus type embodiments and features of the method type embodiments is considered to be disclosed with this application.

BRIEF DESCRIPTION

Some of the embodiments will be described in detail, with reference to the following figures, wherein like designations denote like members, wherein:

FIG. 1 schematically shows a control block diagram of a converter network bridge controller according to embodiments of the invention;

DETAILED DESCRIPTION

Figure 1:
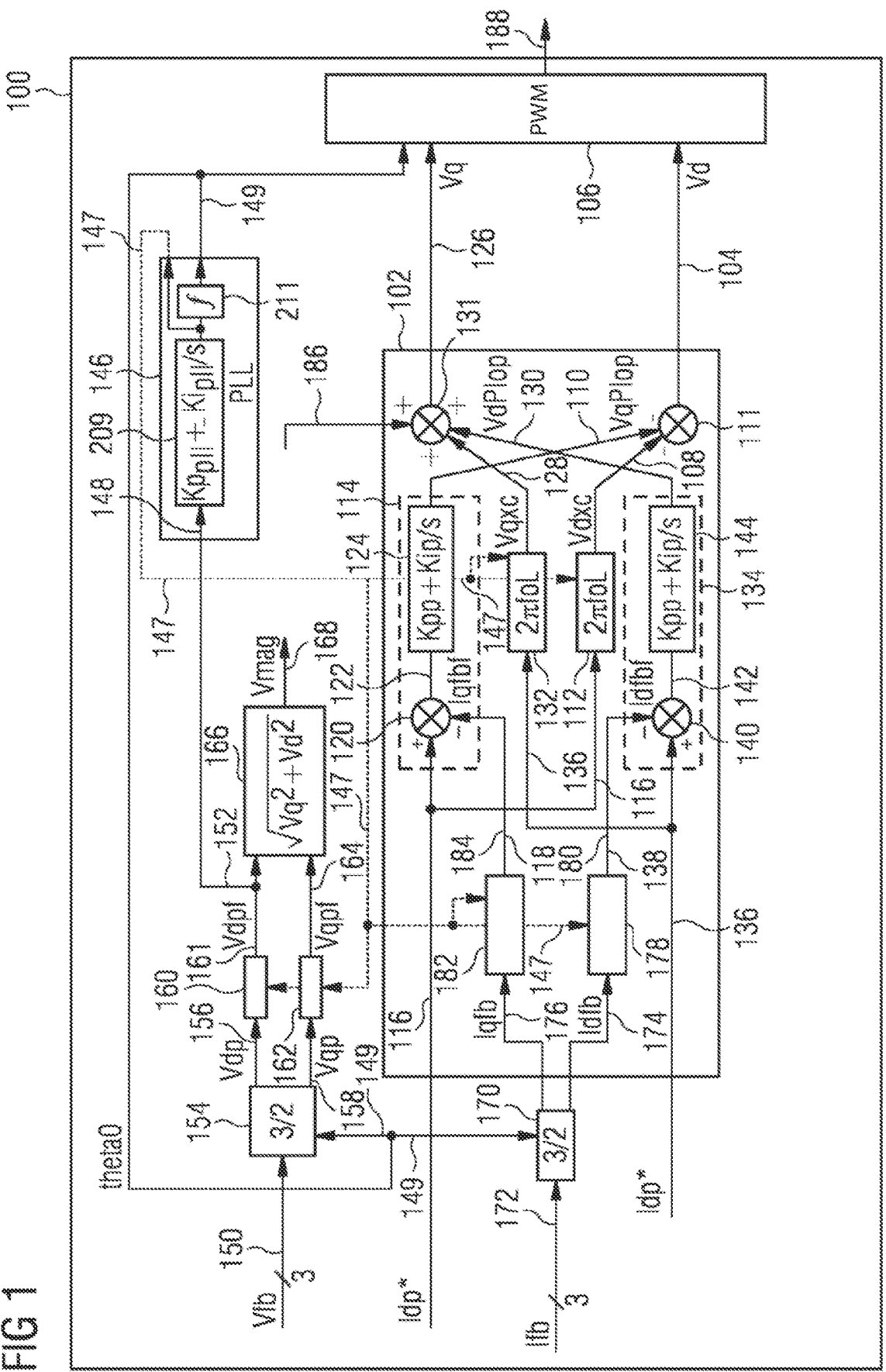

FIG. 1 schematically shows a control block diagram of a converter network bridge controller 100 according to embodiments of the herein disclosed subject matter.

According to an embodiment, the controller 100 comprises an output unit 102, e.g. in the form of a current controller as shown in FIG. 1, which is configured for generating a quadrature voltage component reference 104 to a PWM modulator 106. The PWM modulator 106 may be part of the controller 100 as shown in FIG. 1 or, in another embodiment, may be a separate device. According to an embodiment, the quadrature voltage component reference 104 comprises (i.e. consists of, as shown in FIG. 1) a first signal 108 and a second signal 110. According to an embodiment, a summing unit 111 is provided for adding (the negative values of) the first signal 108 and the second signal 110. (signal 104=−signal 110−signal 108)

The first signal 108 and the second signal 110 are generated by a first part 112 and a second part 114 of the output unit, respectively. According to an embodiment, the first part 112 provides a steady state component and provides the first signal 108 based on a current reference for an active current 116, Idpx that shall be generated by the power converter hardware (not shown in 30 FIG. 1). For example, according to an embodiment, the first signal 108, also referred to as Vdxc, is calculated as:

$$Vdxc=2*\pi*f0*L*Iqp*$$

where of the product $\pi$ is the number pi, f0 is the grid frequency, L is an inductance of the line reactor+turbine transformer and Iqp* is the current reference for an active current 116.

According to an embodiment, the second part 114 is configured for providing the second signal 110 so as to reduce (e.g. to nullify) a difference between a converter active current component 118 of measured feedback current and the current reference for active current 116. In an embodiment, the second part 114 is configured for correcting an error in a feedforward term for the active current reference.

According to an embodiment, the converter active current component 118 and the current reference for an active current 116 are subtracted in a summing junction 120 of the second part 114. The resulting signal 122 is provided to a suitable controller, for example a proportional integral controller 124. According to an embodiment, the gain G(Kpp+Kip) of the proportional integral controller 124 is calculated from:

$$G(Kpp+Kip)=Kpp+\int Kip,$$

Where, for example
  Kpp=BW*L;
  Kip=BW^2*L/4;
  ∫ Kip is the time integral over Kip; and
  L is the inductance of the line reactor+turbine transformer and BW is the desired bandwidth of the current controller.

According to an embodiment, a typical bandwidth is in a range between 20 rad/s and 40 rad/s. For example, according to an embodiment the bandwidth is BW=30 rad/s. Hence, embodiments of the herein disclosed subject matter allow for a lower bandwidth compared to conventional systems (bandwidth typically 600 rad/s).

According to a further embodiment, the output unit 102 is further configured for generating an in-phase voltage component 126 to the PWM modulator 106. In accordance with an embodiment, the in-phase voltage component 126 comprises a third signal 128 and a fourth signal 130. According to an embodiment, a summing unit 131 is provided for adding the third signal 128 and the fourth signal 130. The third signal 128 and the fourth signal 130 are generated by a third part 132 and a fourth part 134 of the output unit 102, respectively.

According to an embodiment, the third part 132 is configured similar to the first part 112. For example, according to an embodiment, the third part 132 provides a steady state component and provides the third signal 128 based on a reactive current reference 136 (i.e. a current reference for an reactive current that shall be generated by the power converter hardware, Idp*).

For example, according to an embodiment, the third signal 128, also referred to as Vqxc, is calculated as:

$$Vqxc=2*\pi*f0*L*Idp*$$

where of the product π is the number pi, f0 is the grid frequency, L is an inductance of the line reactor+turbine transformer and Idp* is the reactive current reference 136.

According to an embodiment, the fourth part 134 is configured for providing the fourth signal 130 so as to reduce (e.g. to nullify) a difference between a converter reactive current component 138 of measured feedback current and the current reference for reactive current 136. According to an embodiment, the fourth part 134 is configured similar to the second part 114. For example, according to an embodiment the fourth part 134 is configured for correcting an error in a feedforward term for the reactive current reference.

According to an embodiment, the converter reactive current component 138 and the current reference for a reactive current 136 are subtracted in a summing junction 140 of the fourth part 134, thus providing a resulting signal 142. Typically, the feedback signal is subtracted from the reference (i.e. signal 142=signal 136−signal 138 in summing unit 140; signal 122=signal 116−signal 118 in summing unit 120).

The resulting signal 142 is provided to a suitable controller, for example a proportional integral controller 144. According to an embodiment, the proportional integral controller 144 is a positive sequence current controller which may be configured identical to the controller 124 of the second part 114. Hence, according to an embodiment, the gain G(Kpp+Kip) of the proportional integral controller 144 of the fourth part 142 is calculated from:

$$G(Kpp+Kip)=Kpp+\int Kip;$$

where
    Kpp=BW*L;
    Kip=BW^2*L/4;
where L and BW and the integral ∫ are given as defined with regard to the controller 124 above.

According to an embodiment, the quadrature component 104 of the output signal is a d-axis reference voltage Vd of a synchronously rotating d-q axis coordinate system and the in-phase component 126 of the output signal is a q-axis reference voltage Vq of the synchronously rotating d-q axis coordinate system.

According to an embodiment, the converter network bridge controller 100 comprises a tracking unit 146 which is configured for aligning the d-q axis coordinate system with an input signal 148 which is based on the measured voltage 150, Vfb of the electricity network. According to an embodiment, the input signal 148 is indicative of the inverse d-axis component of the measured network voltage 150.

The measured network voltage is time varying, so instantaneous in the above context means that the signal represents the magnitude of the network voltage at this particular instance in time. If according to an embodiment the power converter is microprocessor controlled, the calculation of all control quantities will be done with a discreet timestep, for example 200 microseconds (200 μs). In such an exemplary implementation the 'instantaneous' representation of the continuous time varying AC system is updated every 200 μs.

According to an embodiment, the tracking unit 146 is further configured to provide a frequency signal 147 indicative of a grid frequency f0. According to a further embodiment, the tracking unit is further configured to provide an angle signal 149 indicative of a grid angle theta0. In accordance with an embodiment, the frequency signal 147/angle signal 149 is determined by the tracking unit 146 based on the input signal 148. According to a further embodiment, the tracking unit 146 is a phase locked loop controller (PLL controller).

According to an embodiment, the tracking unit 146 comprises a suitable controller 209, for example a proportional integral controller which provides the frequency signal 147 in response to the input signal 148. According to a further embodiment, the tracking unit 146 comprises an integration unit 211 which integrates the frequency signal 147 so as to provide the angle signal 149.

According to an embodiment, the voltage feedback signal 152 is one of two outputs of an output (e.g. a filtered output) of a three-phase alternating current to d-q conversion. For example, according to an embodiment the controller 100 comprises a three-phase alternating current to d-q converter 154 which receives the measured voltage 150 and the angle theta0 149 as an input and provides in response a d-axis voltage component 156, Vdp and a q-axis voltage component 158, Vqp. According to an embodiment, a filter is provided, e.g. a first filter 160 configured for filtering the d-axis voltage component 156 and thereby generate a filtered d-axis voltage component 161, also referred to as Vdpf. According to an embodiment, the filtered d-axis voltage component 161 is taken as the voltage feedback signal 152, as shown in FIG. 1. Further, according to an embodiment, a second filter 162 is provided, the second filter 162 being configured for filtering the q-axis voltage component 158 so as to provide a filtered q-axis component 164, also referred to Vqpf. According to a further embodiment, a magnitude calculation unit 166 is provided, the magnitude calculation unit 166 being configured for calculating a voltage magnitude 168 (also referred to as measured feedback voltage magnitude Vmag) from the filtered d-axis voltage component 161 and the filtered q-axis voltage component 164.

$$Vmag=sqrt(Vdpf2+Vqpf2)$$

According to an embodiment, the alignment of the converter's internal d-q axis reference frame with the measured voltage 150 is performed by controlling the d-axis voltage component 156 to zero, via the action of the tracking unit 146. However, this alignment is a standard technique and is therefore not described in greater detail.

According to an embodiment, the converter active current component 118 of measured feedback current is an output (e.g. a filtered output) of a three-phase alternating current to d-q conversion. For example, according to an embodiment the controller 100 comprises a three-phase alternating current to d-q converter 170 which receives a measured current 172, Ifb and provides a d-axis current component 174, Idfb and a q-axis current component 176, Iqfb. As usual, the d-q converter 170 may also receive the angle theta0. According to an embodiment, a filter is provided, e.g. a third filter 178 configured for receiving the d-axis current component 174 and providing in response a filtered d-axis current component 180, Idfbf. According to an embodiment, the filtered d-axis current component 180 is taken as the converter re-active current component 138 of measured feedback. According to a further embodiment, a fourth filter 182 is provided, the fourth filter 182 being configured for receiving the q-axis current component 176 and for providing in response hereto a filtered q-axis current component 184, Iqfbf. According to an embodiment, the filtered q-axis current component 184 is taken as the converter active current component 118 of measured feedback current, as shown in FIG. 1.

A transformation from a three-phase alternating current system into the d-q axis coordinate system (shown as the 3/2 conversion by d-q converters 154, 170) may be performed using the grid angle 149 (theta0) calculated by the tracking unit 146, as shown in FIG. 1.

According to a further embodiment, wherein the in-phase voltage component 126 comprises a fifth signal 186 (which may also referred to as Vac* or Vac nominal) which is representative of the desired fundamental frequency voltage on the output of the converter. Accordingly, in an embodiment the summing unit 131 is configured for also receiving the fifth signal 186 and adding third signal 128, the fourth signal 130, and the fifth signal 186.

According to an embodiment, the PWM modulator is configured for receiving the in-phase voltage component 126 and the quadrature voltage component 104, and theta0, and providing, in response hereto, and output signal 188, e.g. switching commands for insulated gate bipolar transistors (IGBTs). According to an embodiment, the PWM modulation requires theta0 as well as Vd, Vq.

It is noted that while according to some embodiments described above the second part and the fourth part comprises a proportional-integral controller, according to other embodiments, any suitable controller may be used for this purpose. For example, according to an embodiment the second part and/or the fourth part may comprise a proportional-integral-differential controller.

Further, according to an embodiment (i.e. optionally) any filter described with regard to the controller 100, e.g. the filters (filter blocks) 160, 162, 178, 182 as well as the first part 112 and the third part 132 may contain adaptive (frequency dependent) components. According to an embodiment, the entities 112, 132, 160, 162, 178, 182 may comprise a combination of adaptive and non-adaptive components, in particular the filter blocks 160, 162, 178, 182 may comprise adaptive and non-adaptive filters. To this end, the frequency signal 147 of the tracking unit 146 may be provided to any such adaptive component, as is indicated in FIG. 1 by the dotted lines at 147. For example, the filters 160, 162, 178, 182 may comprise an asymmetric notch filter at, for example, 2*f0=100 Hz and a stability notch filter and (exemplarily shown in FIG. 4).

Figure 2:
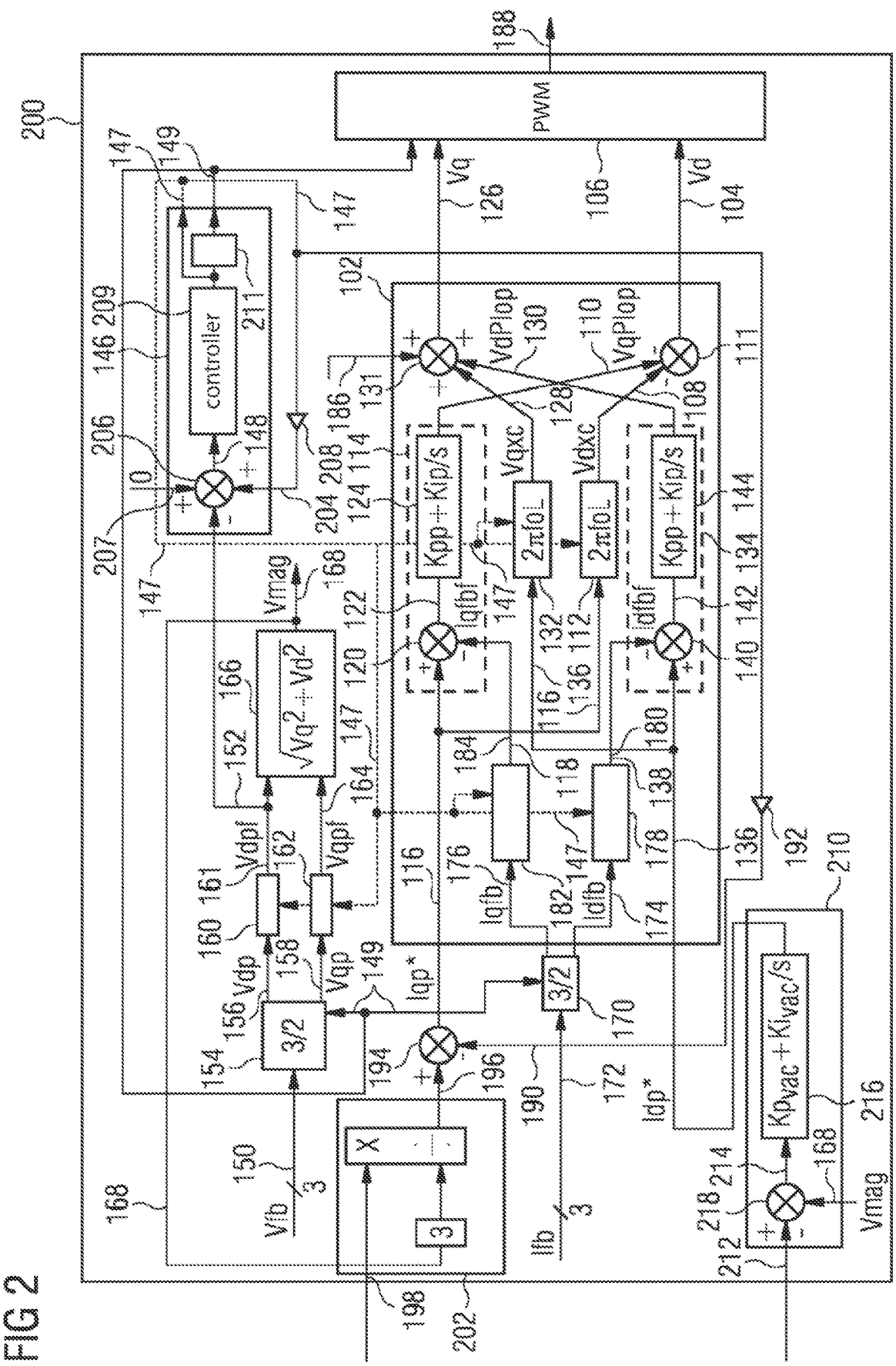
FIG. 2 shows a further control block diagram of a converter network bridge controller according to embodiments of the invention.

FIG. 2 shows a further converter network bridge controller 200 according to embodiments of the herein disclosed subject matter.

The controller 200 shown in FIG. 2 comprises elements which are similar or identical to elements of the controller 100 shown in FIG. 1 and the description of these elements is not repeated here. Rather, in the following additional or different elements of the controller 200 are described with reference to further embodiments.

According to an embodiment, the current reference for active current 116 comprises a current offset component 190 (also referred to as Iqdroop) which is based on the frequency signal 147 of the tracking unit 146. For example according to an embodiment an offset device 192 is provided that receives the frequency signal 147 and provides in response hereto the current offset component 190. According to an embodiment, the offset device 192 comprises a gain stage with a typical again of about 3% of the active current Iq per radian per second (Iqdroop=3% Iq/rad/s)

Iq here means the rated active current of the power converter.

According to a further embodiment, a summing unit 194 is provided, the summing unit 194 being configured for receiving a nominal current reference for active current 196 which is based on a power demand 198 and the measured feedback voltage magnitude 168. According to an embodiment a current reference calculation unit 202 is provided which is configured for receiving the power demand 198 and the measured feedback voltage magnitude 168 and provided in response hereto the nominal current reference for active current 196.

According to an embodiment, the current reference calculation unit 202 calculates the active current demand from the wind turbine power demand. The wind turbine power demand is calculated by the wind turbine controller to (typically) maximize the power extracted from the available wind conditions.

The summing unit 194 is further configured for subtracting the current offset component 190 from the nominal current reference for active current 196 so as to provide the current reference for active current 116. Subtracting the current offset component 190 from the nominal current reference for active current 196 may support the current controller 102 to find a stable operating point in particular if the converter is operating in an island mode (not connected to the grid).

According to a further embodiment, the input signal 148 is not only based on the voltage feedback signal 152 but also on the frequency signal 147 of the tracking unit. For example, according to an embodiment a voltage offset component 204 (which may be also referred to as Vddroop) is added to the voltage feedback signal 152. Adding the voltage offset component 204 to the voltage feedback signal 152 may support the tracking unit to find a stable frequency operating point in particular if the converter is operating in an island mode (not connected to the grid).

According to an embodiment, the converter network bridge controller 200 comprises a summing unit 206 for adding the voltage feedback signal 152 and the voltage offset component 204 so as to provide the input signal 148. According to a further embodiment, a zero voltage signal 207 may be added to the output signal 148, e.g. by respectively configuring the summing unit 206, as shown in FIG. 2.

According to an embodiment, the voltage offset component 204 is provided by a voltage offset calculation unit 208, e.g. a gain stage. A typical again of the offset calculation unit 208 may be −1 Volt per radian per second (Vddroop=−1 V/rad/s).

According to a further embodiment, the reactive current reference 136 is provided by a voltage controller 210 (Vac controller), as shown in FIG. 2. According to an embodiment, the voltage controller 210 receives a voltage demand 212 and the measured feedback voltage magnitude 168 as input 214 to a controller 216, e.g. a proportional integral controller. According to an embodiment, a summing unit 218 is provided for subtracting the measured feedback voltage magnitude 168 from the voltage demand 212, as shown in FIG. 2. According to an embodiment, the voltage controller 210 provides in response to the voltage demand 212 and the measured feedback voltage magnitude 168 the current reference for reactive current 136 (also referred to as Idp*).

Figure 3:
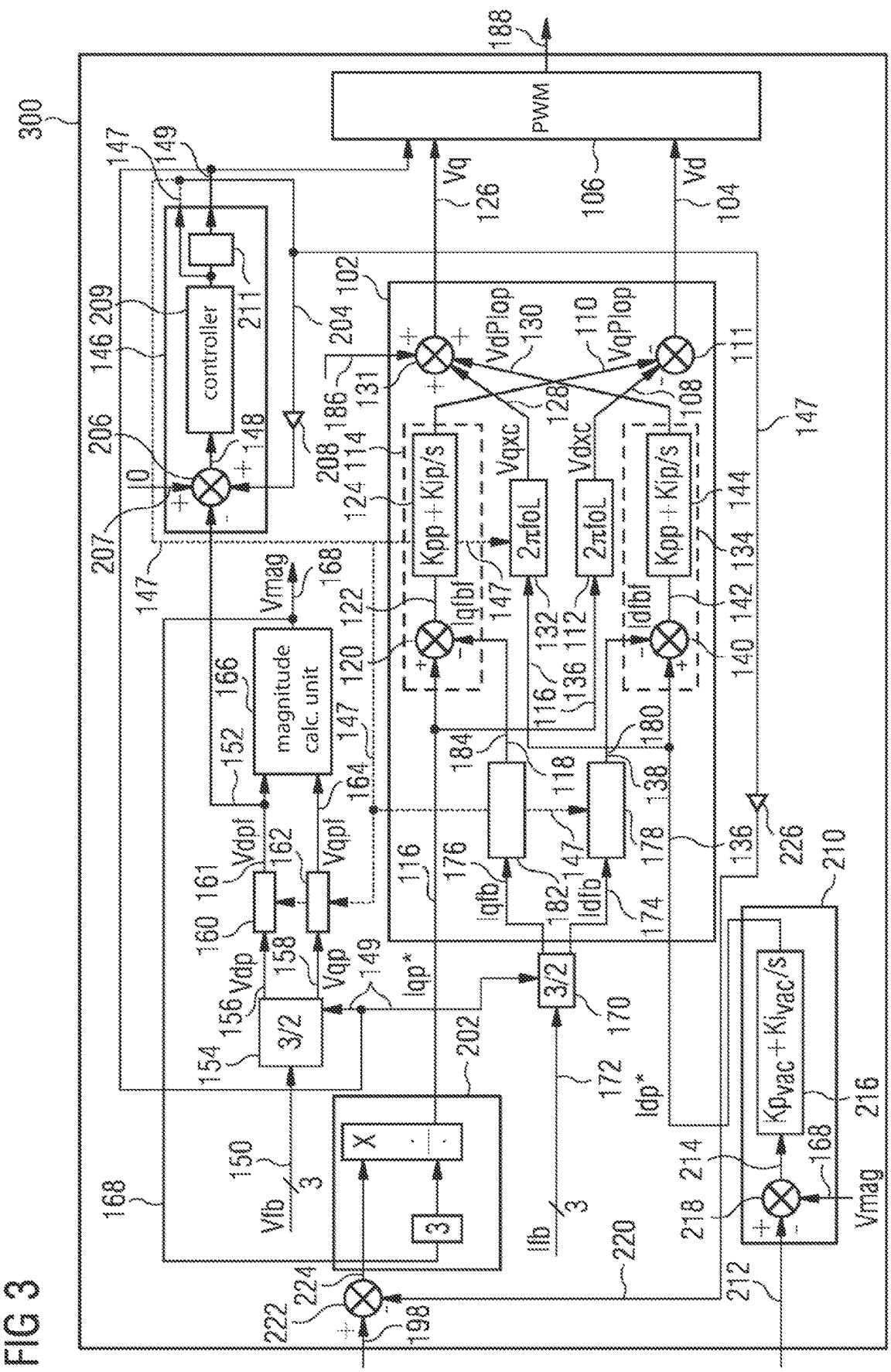
FIG. 3 shows a further control block diagram of a converter network bridge controller according to embodiments of the invention.

FIG. 3 shows a further converter network bridge controller 300 according to embodiments of the herein disclosed subject matter.

The controller 300 shown in FIG. 3 comprises elements which are similar or identical to elements of the controller 100 shown in FIG. 1 and the controller 200 shown in FIG. 2 and the description of these elements is not repeated here. Rather, in the following additional or different elements of the controller 300 are described with reference to further embodiments.

Instead of subtracting the current offset component 190 from the nominal current reference for active current 196 as described with regard to FIG. 2, a power offset component 220 may be subtracted from the power demand 198, as shown in FIG. 3. According to an embodiment, the power offset component 220 is provided based on the frequency signal 147 of the tracking unit 146. For example according to an embodiment a power offset device 226 is provided that receives the frequency signal 147 and provides in response hereto the power offset component 220.

According to an embodiment, the controller 300 comprises a summing unit 222 for subtracting the power offset component 220 from the power demand 198 so as to provide a modified power demand 224, as shown in FIG. 3. The modified power demand 224 is then provided to the current reference calculation unit 202 which provides the current reference for active current 116 based on the modified power demand 224 and measured feedback voltage magnitude 168.

Subtracting the power offset component 220 from the power demand 198 may support the current controller 102 to find a stable operating point in particular if the converter is operating in an island mode (not connected to the grid).

Having regard to FIG. 2 and FIG. 3 described above, subtracting the current offset component 190 from the nominal current reference for active current 196 or subtracting the power offset component 220 from the power demand 198 may allow the converter to have a frequency to power relationship that enables a group of converters with the described control or other generators to share the balancing of active power demand in an isolated (islanded) network. In such a network it is necessary for the generators to be able satisfy the fluctuating active power demand in a way where a given number of participating generators share (e.g. via the frequency of the island network) the difference between scheduled power (the sum of the active power references) and the actual demand.

Figure 4:
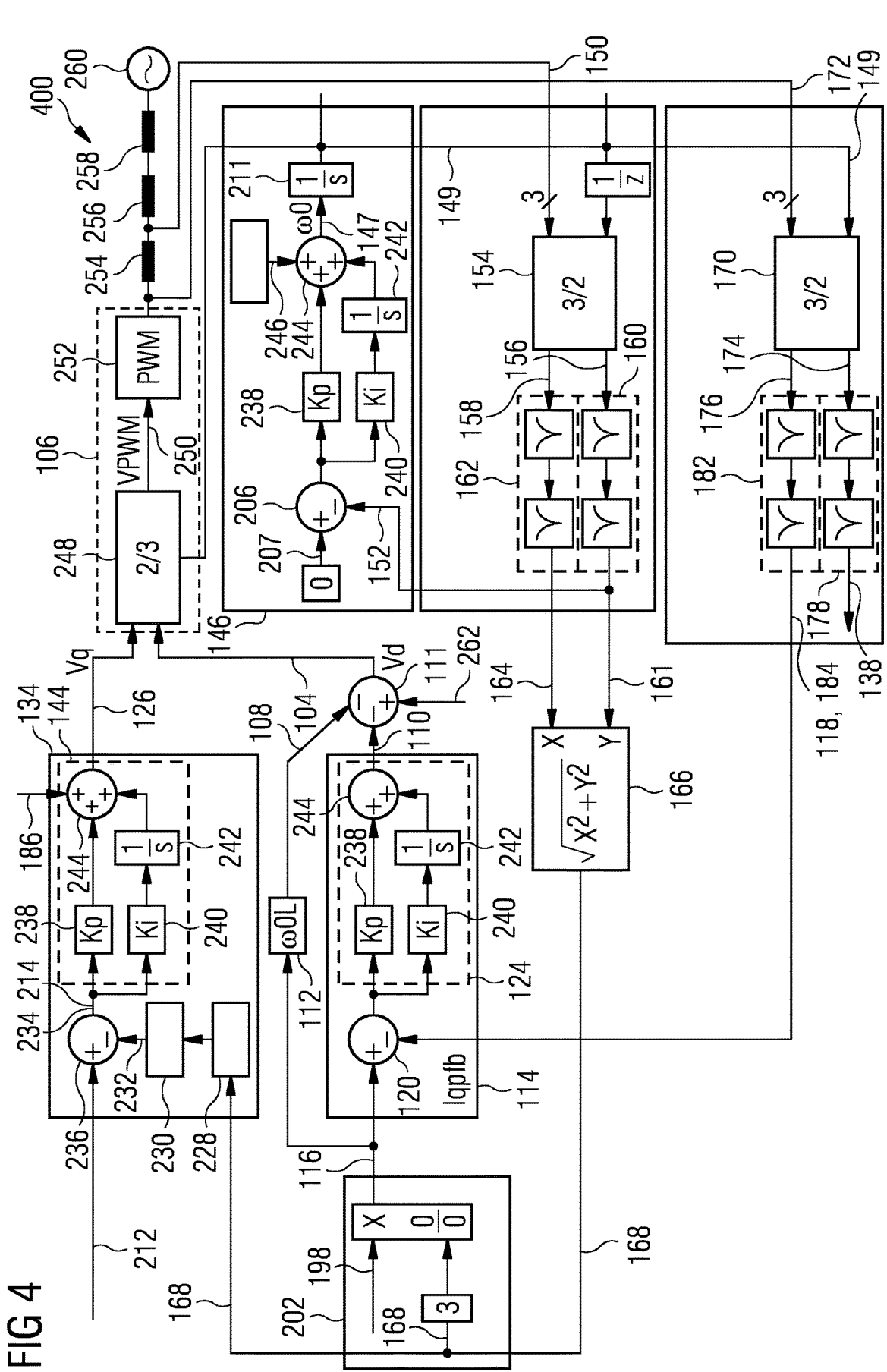
FIG. 4 shows a further control block diagram of a converter network bridge controller according to embodiments of the invention.

FIG. 4 shows a further converter network bridge controller 400 according to embodiments of the herein disclosed subject matter.

The controller 400 shown in FIG. 4 comprises elements which are similar or identical to elements of the controller 100 shown in FIG. 1, the controller 200 shown in FIG. 2 and the controller 300 shown in FIG. 3 and the description of these elements is not repeated here. Rather, in the following additional or different elements of the controller 400 are described with reference to further embodiments.

According to an embodiment, the in-phase voltage component reference 126 is generated (e.g. by a further part 134 of the controller) based on the voltage demand 212 and the feedback voltage 150 or, more particularly, based on the voltage demand 212 and the voltage magnitude 168, as shown in FIG. 4.

According to an embodiment, the voltage magnitude 168 is filtered by a filter 228 (fifth filter) then subjected to a percentage calculation unit 230 which provides a percentage of measured voltage 232 (with respect to the nominal voltage). A difference 234 of the percentage of measured voltage 232 and the voltage reference 212 (in percent) is determined as input 214 to the controller 144. The controller 144 generates in response to the input 214 the in-phase voltage component reference 126.

According to an embodiment, a summing unit 236 is provided for receiving the voltage magnitude 168 or a signal derived therefrom (e.g. the percentage of measured voltage 232), and the voltage demand 212 and provide, in response hereto, the difference 234.

According to a further embodiment, a PI controller as disclosed herein, e.g. the controller 144 comprises a KP gain block 238 and a KI gain block 240, a integration block 242 for integrating the output of the KI block, and a summing unit 244 for adding the output of the gain KP block and the integrated output of the KI gain block to an output (e.g. the in-phase voltage component reference 126 in the illustrated embodiment). It should be understood that for example the PI controller 124 or the PI controller of the tracking unit 146 may be configured accordingly and in FIG. 4 the corresponding blocks thereof have been provided with the same reference signs.

With regard to the tracking unit 146 it is noted that the summing unit 244 also receives a nominal frequency 246.

Different from the controllers 100, 200, 300, the controller 400 in FIG. 4 explicitly shows a d-q to three-phase AC conversion block 248 which receives the quadrature voltage component reference 104 and the in-phase voltage component reference 126 and provides in response hereto a PWM input signal 250 to a PWM modulator 250. The PWM modulator provides switching commands to the converter reactor 254 the output of which is provided via components 256, 258 to the grid 260.

According to an embodiment, the quadrature voltage component reference comprises, besides the first signal 108 and the second signal 110 a quadrature voltage feedforward component 262, as shown in FIG. 4. However, in most cases the quadrature voltage feedforward component 262 (also referred to as VdFfwd) will be zero or close to zero and hence may be omitted according to an embodiment.

Hence, according to an embodiment the reference voltages Vd, 104 (quadrature voltage component reference), Vq (in-phase voltage component reference), 126 to the PWM modulator are calculated as follows.

According to an embodiment (similar to what is shown in FIG. 1, FIG. 2 and FIG. 3, a further signal (Vac* or Vacnominal 186, see also FIG. 1, FIG. 2 or FIG. 3) may be added to Vq, e.g. in the summing unit 244 of the controller 144).

$Vq(126)$=output of $VacPIop(144)$=(in the above described embodiment)=output of the $KP$ gain block 238+output of the integration block 242+ ($Vac^*$ or $Vacnominal$,186).

$Vd(104)=Vqxc(108)+VqPIop(110)+Vdff(262)$

Figure 5:
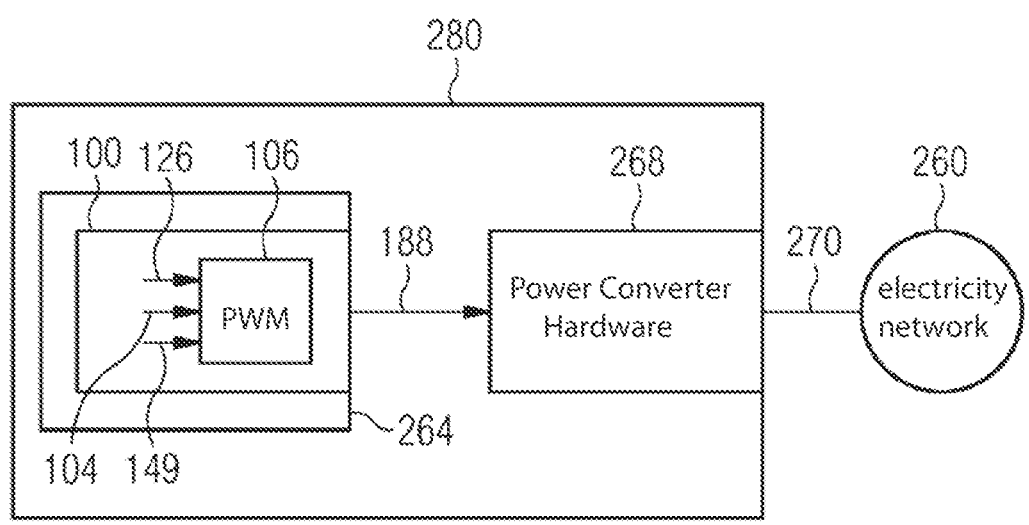
FIG. 5 shows a power converter according to embodiments of the invention.

FIG. 5 shows a power converter 280 according to embodiments of the herein disclosed subject matter.

The power converter comprises a converter network bridge controller according to embodiments of the herein disclosed subject matter, e.g. a converter network bridge controller 100 as described with regard to FIG. 1. In accordance with an embodiment, the power converter comprises a processor device 264 on which the converter network bridge controller 100 (or 200, 300, 400) is implemented. According to an embodiment the converter network bridge controller is implemented in software, e.g. in the form of a computer program product according to embodiments of the herein disclosed subject matter. According to an embodiment, the processor device 264 comprises at least one processor which is configured for executing a program element according to embodiments of the herein disclosed subject matter.

According to an embodiment, the program element is configured for, when executed by the processor device 264, providing the converter network bridge controller 100 (or, in other embodiments, the converter network bridge controllers 200, 300 or 400) as described in accordance with embodiments of the herein disclosed subject matter. By operation of the network bridge controller according to embodiments of the herein disclosed subject matter, an output signal 188 of the PWM modulator 106 is provided. According to an embodiment the PWM modulator (e.g. as part of the converter network bridge controller) is also implemented in software. According to an embodiment, the output signal 188 of the PWM modulator is provided based on a quadrature voltage component reference Vd, an in-phase voltage component reference Vq and an angle signal theta0, as shown in FIG. 5.

Further in accordance with an embodiment, the power converter 280 comprises a power converter hardware 268 which is configured for receiving the output signal 188 of the PWM modulator and in response hereto, converting power of a power generation device, such as a wind turbine generator, into output power that is supplied to an electricity network 260, such as a grid, via an electrical connection 270 between the power converter 280 and the electricity network 260. It should be understood that the electricity network 260 may also be an islanded electricity network. In such a case, the droop signals 190, 204, 220 described with regard to FIG. 2 and FIG. 3 act to improve stability of the operation of the converter network bridge controller. According to an embodiment, the power converter hardware 268 comprises power electronic components, such as IGBTs, and may comprise other hardware, e.g. power supplies and gate drivers for the power electronic components (not shown in FIG. 5).

According to embodiments of the herein disclosed subject matter, any suitable entity (e.g. controllers, units and devices) disclosed herein are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. controllers, units and devices) is not limited to a dedicated entity as described in some embodiments. Rather, the herein disclosed subject matter may be implemented in various ways and with various granularity on device level or software module level while still providing the desired functionality. Further, it should be noted that according to embodiments a separate entity (e.g. a software module, a hardware module or a hybrid module) may be provided for each of the functions disclosed herein.

According to other embodiments, an entity (e.g. a software module, a hardware module or a hybrid module (combined software/hardware module)) is configured for providing two or more functions as disclosed herein. According to an embodiment, the converter network bridge controller comprises a processor device including at least one processor for carrying out at least one computer program corresponding to a respective software module.

Generally herein a summing unit may be a summing junction.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

A converter network bridge controller 200 for a power converter hardware 268 being connectable to an alternating current electricity network 260 is provided. The controller 200 comprises an output unit 102 configured for generating a direct 104 and quadrature voltage component reference 126 to a PWM modulator 106 which determines the switching of the power converter hardware 268, wherein the quadrature voltage component reference 126 comprises a first signal 108 and a second signal 110. The output unit 102 comprises a first part 112 and a second part. The first part 112 is configured for generating the first signal 108 based on a current reference for an active current 116 to be generated by the power converter hardware 268. The second part is configured for providing the second signal 110 to reduce a difference between a converter active current component 118 of measured feedback current and the current reference for active current 116.

According to an embodiment, the current controller is a positive sequence current controller, with the d-axis and q-axis outputs of the feedforward correction units (first part 114 and third part 134 of the current controller 102) routed to the opposite axis Vq and Vd, respectively.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A converter network bridge controller for a power converter hardware, the power converter hardware configured to connect to an alternating current electricity network, comprising:

an output unit configured for generating a quadrature voltage component reference to a PWM modulator which determines a switching of the power converter hardware, wherein the quadrature voltage component reference comprises a first signal and a second signal, and wherein the quadrature voltage component reference is a d-axis reference voltage of a synchronously rotating d-q axis coordinate system;

the output unit comprising a first part and a second part;

the first part being configured for generating the first signal based on a current reference for an active current to be generated by the power converter hardware; and the second part being configured for providing the second signal to reduce a difference between a converter active current component of measured feedback current and the current reference for the active current; and a tracking unit configured for:
aligning the synchronously rotating d-q axis coordinate system with an input signal which is based on a measured network voltage,
providing a frequency signal indicative of a grid frequency, and
providing an angle signal indicative of a grid angle,
wherein the frequency signal and the angle signal are computed based on the input signal.

2. The converter network bridge controller of claim 1, wherein the output unit is further configured for generating an in-phase voltage component reference to the PWM modulator; wherein:
(i) the in-phase voltage component reference comprises a third signal and a fourth signal, the output unit comprising a third part and a fourth part, the third part being configured for generating the third signal based on a current reference for a reactive current, and the fourth part being configured for providing the fourth signal to reduce a difference between a converter reactive current component of the measured feedback current and the current reference for the reactive current;
or
(ii) a further part of the output unit is configured for generating the in-phase voltage component reference based on a voltage demand and a voltage feedback signal.

3. The converter network bridge controller according to claim 2, wherein the in-phase voltage component reference comprises a fifth signal which is representative of a desired steady state fundamental frequency voltage on the output of the power converter hardware.

4. The converter network bridge controller according to claim 1,
the input signal being based on a voltage feedback signal indicative of an instantaneous d-axis voltage component of the measured network voltage.

5. The converter network bridge controller of claim 4, wherein the input signal is further based on the frequency signal of the tracking unit:
wherein the tracking unit comprises a first summing unit being configured for summing (i) the voltage feedback signal and (ii) an offset component being based on the frequency signal and to thereby provide the input signal.

6. The converter network bridge controller according to claim 5, further comprising:
a second summing unit;
the second summing unit being configured for receiving a nominal current reference for the active current which is based on a power demand and a measured feedback voltage magnitude;
the second summing unit being further configured for receiving a current offset signal which is based on the frequency signal of the tracking unit; and
the second summing unit being configured for providing the current reference for the active current based on the nominal current reference for the active current and the current offset signal.

7. The converter network bridge controller according to claim 5, further comprising:
a second summing unit;
the second summing unit being configured for receiving a power demand;
the second summing unit being further configured for receiving a power offset signal which is based on the frequency signal of the tracking unit; and
the second summing unit being configured for providing a modified power demand based on the power demand and the power offset signal to a current reference calculation unit for calculating the current reference for the active current based on the modified power demand and a measured feedback voltage magnitude.

8. The converter network bridge controller of claim 4, wherein the voltage feedback signal is a filtered d-axis component of the measured network voltage.

9. The converter network bridge according to claim 1, wherein the current reference for the active current comprises an offset component which is based on the frequency signal of the tracking unit.

10. The converter network bridge controller according to claim 1, wherein the first part of the output unit is configured for providing the first signal based on the frequency signal or the angle signal of the tracking unit.

11. A power converter comprising:
the converter network bridge controller according to claim 1; and
the power converter hardware controlled by an output signal of the converter network bridge controller.

12. A method of generating a control signal for a power converter hardware, the power converter hardware configured to be connected to an alternating current electricity network, the method comprising:
generating, by an output unit, a quadrature component of the control signal to a PWM modulator, which determines a switching of the power converter hardware, depending on a first signal and a second signal, wherein the quadrature voltage component reference is a d-axis reference voltage of a synchronously rotating d-q axis coordinate system;
generating, by a first part of the output unit, the first signal based on a current reference for an active current to be generated by the power converter hardware; and
providing, by a second part of the output unit, the second signal to reduce a difference between a converter active current component of a measured feedback current and the current reference for the active current;
aligning, by a tracking unit, the synchronously rotating d-q axis coordinate system with an input signal which is based on a measured network voltage;
providing, by the tracking unit, a frequency signal indicative of a grid frequency; and
providing, by the tracking unit, an angle signal indicative of a grid angle;
wherein the frequency signal and the angle signal are computed based on the input signal.

13. A computer program product, comprising a non-transitory computer readable hardware storage device having computer readable program code stored therein, said program code executable by a processor of a computer system to implement the method according to claim 12.

* * * * *